United States Patent [19]

Takahashi et al.

[11] Patent Number: 4,994,915
[45] Date of Patent: Feb. 19, 1991

[54] APERTURE CORRECTION CIRCUIT

[75] Inventors: Satoshi Takahashi; Eiji Takagi; Yukinari Ueki, all of Yokohama; Hideaki Ohki, Fujisawa; Koji Kamogawa, Yokohama, all of Japan

[73] Assignee: Hitachi, Ltd., Tokyo, Japan

[21] Appl. No.: 349,869

[22] Filed: May 10, 1989

[30] Foreign Application Priority Data

May 18, 1988 [JP] Japan ................. 63-119093
Sep. 7, 1988 [JP] Japan ................. 63-222361

[51] Int. Cl.$^5$ .......................................... H04N 5/208
[52] U.S. Cl. ...................................... 358/162; 358/166
[58] Field of Search .................. 358/37, 162, 160, 166

[56] References Cited

U.S. PATENT DOCUMENTS 4,041,531 8/1977 Bingham ........................... 358/37

OTHER PUBLICATIONS

McMann, Jr. et al. "Improved Signal Processing Techniques", SMPTE Journal, vol. 77 3/1968, pp. 221-228.

Primary Examiner—James J. Groody
Assistant Examiner—David E. Harvey
Attorney, Agent, or Firm—Antonelli, Terry, Stout & Kraus

[57] ABSTRACT

The aperture correction circuit of the present invention comprises a preshoot signal generator which generates the preshoot signal of the edge part of a video signal, an overshoot signal generator which generates the overshoot signal of the edge part of the video signal, a shoot signal composition circuit which adds the preshoot signal and the overshoot signal at an addition ratio corresponding to a control signal, thereby to deliver the resulting signal as a correcting shoot signal, and an adder which adds the video signal and the correcting shoot signal, thereby to deliver the resulting signal as an output, wherein the shoot signal composition circuit is supplied as the control signal with a signal which changes according to the input video signal, such as the differentiated signal of the input video signal. Thus, the ratio between the preshoot signal and the overshoot signal is dynamically changed according to the input signal, so that an image quality can be adjusted according to the input video signal.

8 Claims, 12 Drawing Sheets

FIG. 4 (PRIOR ART)
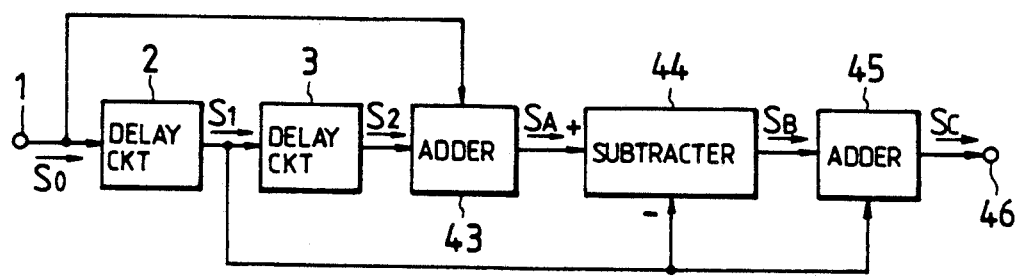
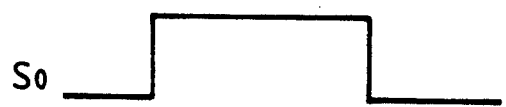
FIG. 5A  $S_0$
FIG. 5B  $S_1$
FIG. 5C  $S_2$
FIG. 5D  $S_A$
FIG. 5E  $S_B$
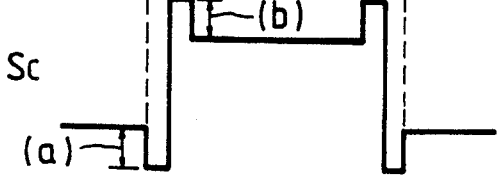
FIG. 5F  $S_C$

FIG. 7A  S₀
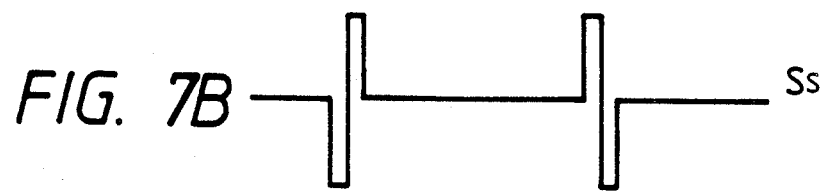
FIG. 7B  Sₛ
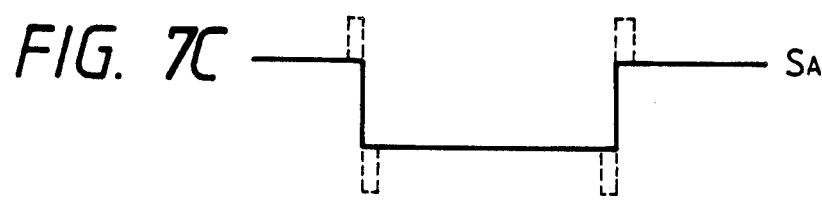
FIG. 7C  S_A
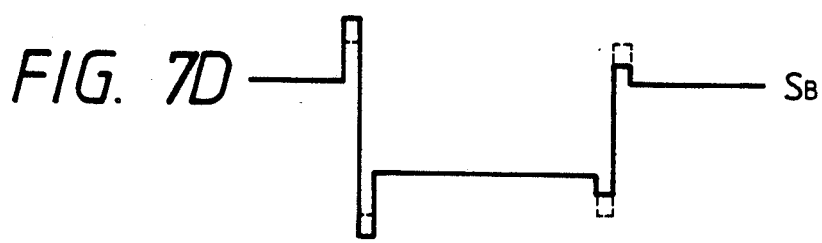
FIG. 7D  S_B

VOLTAGE OF SHOOT BALANCE CONTROL TERMINAL (82)

FIG. 11A — So
FIG. 11B — Sa
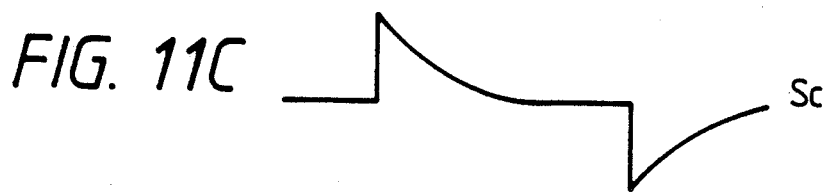
FIG. 11C — Sc
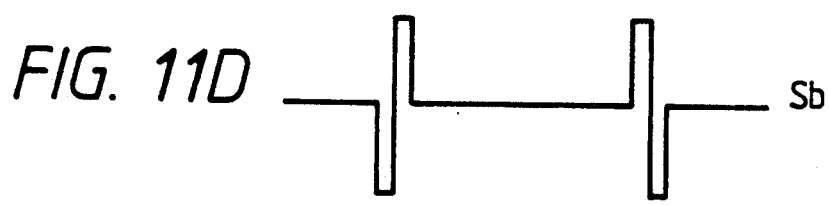
FIG. 11D — Sb
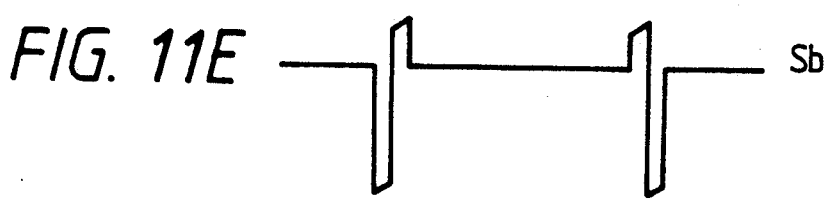
FIG. 11E — Sb
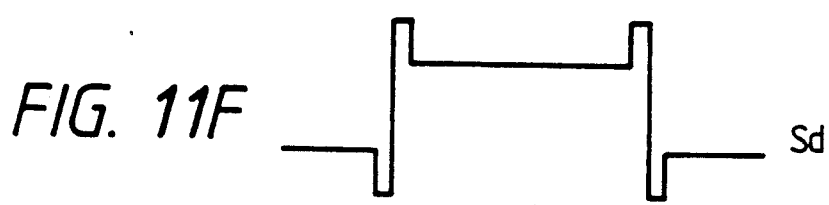
FIG. 11F — Sd
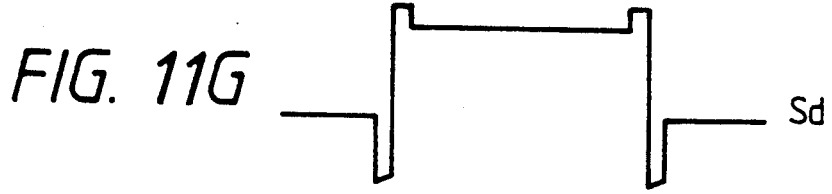
FIG. 11G — Sd

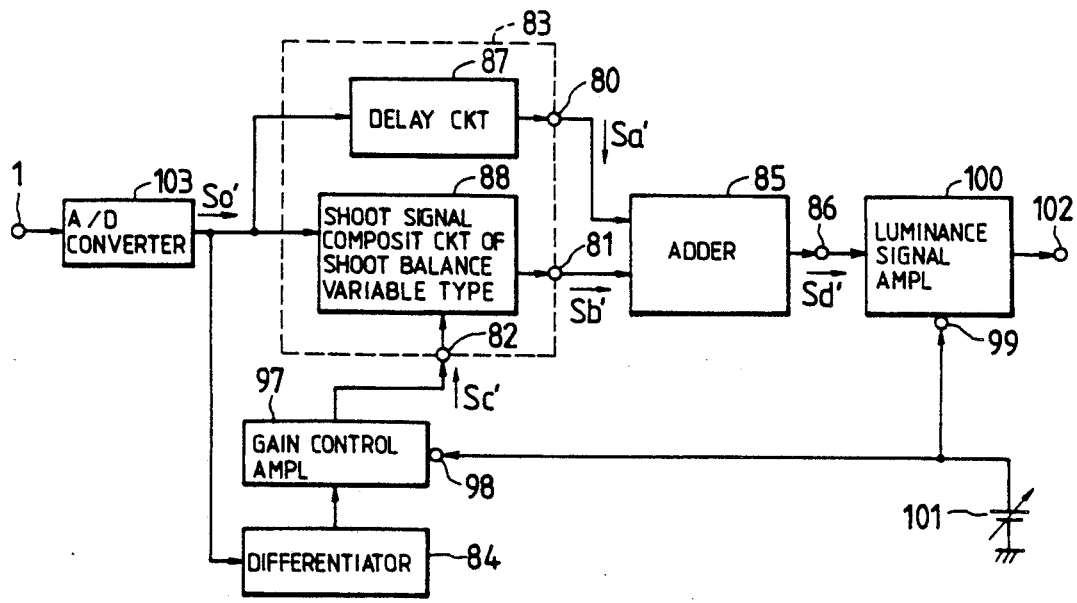
FIG. 14
FIG. 15A — Sc
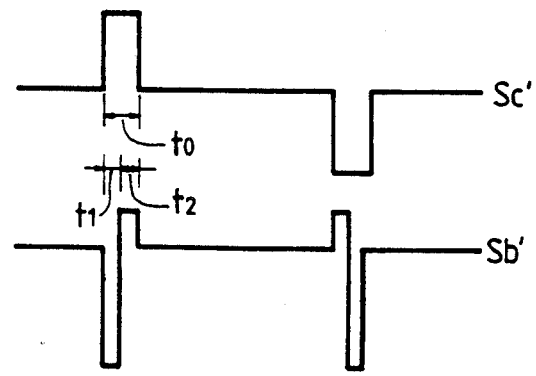
FIG. 15B — Sc'
FIG. 15C — Sb'
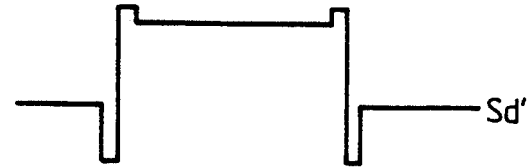
FIG. 15D — Sd'

FIG. 17A  S₀
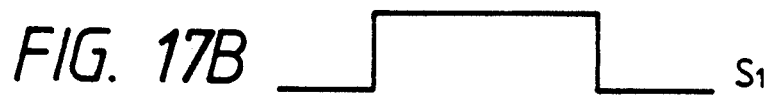
FIG. 17B  S₁
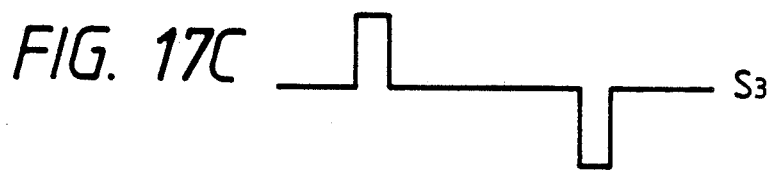
FIG. 17C  S₃
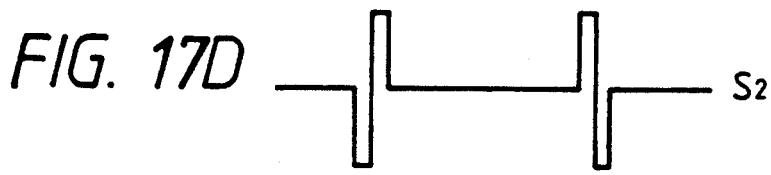
FIG. 17D  S₂
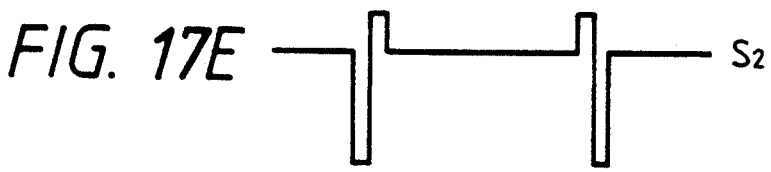
FIG. 17E  S₂
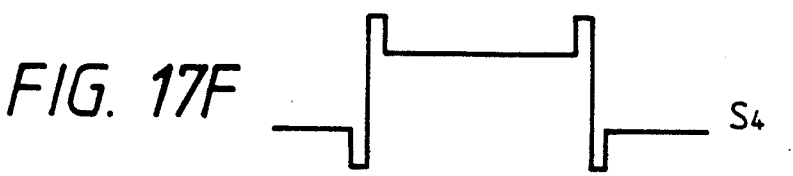
FIG. 17F  S₄
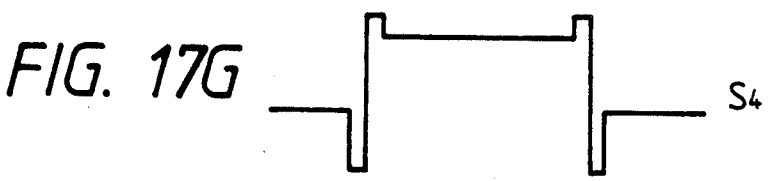
FIG. 17G  S₄

APERTURE CORRECTION CIRCUIT

BACKGROUND OF THE INVENTION

The present invention relates to an aperture correction circuit which corrects the aperture aberration of the video signal of a television receiver in order to reproduce a sharp image.

An aperture correction circuit in the prior art has been as shown in FIG. 4.

FIG. 4 is a block diagram showing the circuit arrangement of the prior-art example, while FIGS. 5A–5F are waveform diagrams of the signals of various portions within the circuit shown in FIG. 4.

Referring to FIG. 4, when a signal $S_0$ is received at a video signal input terminal 1, a signal $S_1$ delayed through a delay circuit 2 and a signal $S_2$ further delayed through a delay circuit 3 are obtained. First, the signals $S_0$ and $S_2$ are added by an adder 43 to produce a signal $S_A$ Since this signal $S_A$ becomes a signal as indicated by $S_A$ in FIG. 5D, an aperture correcting shoot signal $S_B$ (shown in FIG. 5E) can be obtained in such a way that the signal $S_1$ being the output of the delay circuit 2 is subtracted from the signal $S_A$ by a subtracter 44.

In this case, assuming that the signal amplitudes of the signals $S_0$, $S_1$ and $S_2$ are equal, also the maximum amplitude of the output $S_A$ of the adder 43 needs to be equal to them, and this is as illustrated in FIG. 5D. Further, the output $S_B$ of the subtracter 44 and the output $S_1$ of the delay circuit 2 are added by an adder 45, whereby a video output $S_C$ after the correction of an aperture aberration is obtained at an output terminal 46. The waveforms of the signals in FIG. 4 become as shown in FIGS. 5A–5F.

As seen from the waveform $S_C$ in FIG. 5F, the ratio between the amplitudes of a preshoot signal (a) and an overshoot signal (b) has generally been 1:1 with the prior-art circuit arrangement. Alternatively, the amplitude ratio between the preshoot signal and the overshoot signal can be set as being somewhat unbalanced. Since, however, the balance between the amplitude ratio of the shoot signals is fixed to the last, the prior-art system has difficulty in attaining image qualities in correspondence with various video input sources or input conditions.

An aperture correction circuit capable of changing the amplitudes of the shoot signals is disclosed in the official gazette of Japanese Patent Application Laid-open No. 56-68073.

Meanwhile, conventional aperture correction circuits have generally employed a method in which a shoot signal prepared from a video signal is directly added to the original signal without being reprocessed. Therefore, blooming ascribable to the shoot signal appears at the bright part of a screen. As a circuit in which the relief of the blooming is considered, there has been employed an arrangement as shown in the circuit diagram of TH-26B1 or TH-29B1 ② on p. 145 in "Service Book for All Manufacturers" which is an extra issue of "Terebi Gijutsu (Television Engineering)" dated Sept. 20, 1987.

The prior-art circuit arrangement is shown in FIG. 6, while the waveforms of signals at several parts in FIG. 6 are shown in FIGS. 7A–7D. Referring to FIG. 6, a signal $S_0$ received at a video signal input terminal 1 is applied to a delayed video signal terminal 51 for a video chroma IC 60 (in FIG. 6, only a video circuit is shown in blocks) through a delay line 2. The signal $S_0$ is further applied to a video signal input terminal 50 from the input side of the delay line 2. The applied signals are subjected to reflection-type delay-line aperture correction processing by an image quality adjuster 56, thereby to compose a shoot signal. The amount of the shoot signal to be superposed on the video signal is varied according to a control signal at an image quality adjusting input terminal 52, whereby the image quality of the video signal is adjusted. The resulting output SA is delivered to a luminance signal output terminal 68 for the IC 60 via a contrast adjuster 57, a pedestal clamp circuit 58 and a luminance signal amplifier 59. The output of the terminal 68 is amplified by an emitter follower of Darlington connection which is configured of an N-P-N transistor 71, a P-N-P transistor 72, and resistors 70, 73. The amplified output signal is delivered from a luminance signal output terminal 75 to a CRT drive circuit at a succeeding stage. On the other hand, the amplified output signal is passed via a resistor 69 and is further amplified by an emitter follower circuit which is configured of a P-N-P transistor 67 and a resistor 66. The resulting output is divided by resistors 61, 63 and a variable resistor 62, and the divided voltage is applied as the control signal to the image quality adjusting input terminal 52. In this way, the image quality, namely, the amount of the shoot signal to be added to the original signal of the video signal is controlled according to the output amplitude of the output luminance signal, thereby to make the corrections of decreasing the amount of the shoot signal at a bright part on a picture frame so as to relieve blooming and increasing the amount of the shoot signal at a dark part.

The signal waveforms at several parts in the arrangement become as illustrated in FIGS. 7A–7D. The original signal $S_0$ of the video signal (in FIG. 7A) and the shoot signal $S_S$ composed from the signal $S_0$ (in FIG. 7B) are added by the image quality adjuster 56 in FIG. 6, to become as indicated by dotted lines at $S_A$ (in FIG. 7C). The signal waveform at the luminance signal output terminal 68 in FIG. 6, and the waveform $S_B$ (in FIG. 7D) at the emitter follower output 75 in FIG. 6 become waveforms of dotted lines accordingly. Since, however, the waveform $S_B$ (in FIG. 7D) is used for the control of the image quality adjustment in the circuit arrangement, actually the signal output $S_B$ (in FIG. 7D) at the emitter-follower output terminal 75 becomes as indicated by a solid line due to a delay time involved in the course from the output of the image quality adjuster 56 to the image quality adjusting input terminal 52, and the aperture aberration is not properly corrected at the leading edge of an aperture in principle. Another problem is that, since the amount of the shoot signal is larger at a part of lower luminance, the S/N (signal-to-noise) ratio of the video signal degrades.

With the prior-art aperture correction circuit, the ratio between the amount of the preshoot signal and that of the overshoot signal is fixed, and hence, it has been impossible to adjust the image quality in consideration of even the shoot balance corresponding to the applied video signal.

The timing of the composition of the video signal and the aperture correction signal is not sufficiently considered, either, so that the image quality adjustment at the leading edge of the aperture has been unsatisfactory.

SUMMARY OF THE INVENTION

An object of the present invention is to provide an aperture correction circuit for images which permits all video inputs to undergo aperture corrections of optimal conditions, whereby a picture frame can be reproduced under the optimal conditions.

Another object of the present invention is to realize optimal aperture corrections of proper timings in accordance with signal contents, whereby a picture frame is reproduced under optimal conditions.

The aperture correction circuit of the present invention comprises a preshoot signal generator which generates the preshoot signal of the edge part of a video signal, an overshoot signal generator which generates the overshoot signal of the edge part of the video signal, a shoot signal composition circuit which adds the preshoot signal and the overshoot signal at an addition ratio corresponding to a control signal, thereby to deliver the resulting signal as a correcting shoot signal, and an adder which adds the video signal and the correcting shoot signal, thereby to deliver the resulting signal as an output. Thus, the ratio between the amplitude of the preshoot signal and that of the overshoot signal changes according to the control signal, so that an image quality can be adjusted according to the input signal by dynamically changing the control signal in accordance with the input signal. The differentiated signal of the input video signal is employed as the control signal.

BRIEF DESCRIPTION OF THE DRAWINGS

FIG. 4 is a block diagram showing a prior-art example of an aperture correction circuit;

FIGS. 5A-5F are waveform diagrams showing the signal waveforms of various parts in FIG. 4;

FIGS. 7A-7D are waveform diagrams showing the signals of several parts in FIG. 6;

FIGS. 11A-11G are waveform diagrams showing the signals of various parts in FIG. 8;

FIG. 14 is a block diagram showing the circuit arrangement of the fifth embodiment of the present invention;

FIGS. 15A-15D are waveform diagrams showing the signals of several parts in FIGS. 13 and 14;

FIGS. 17A-17G are waveform diagrams showing the signals of various parts in FIG. 1 in the case of using the differentiator in FIG. 16.

DESCRIPTION OF THE PREFERRED EMBODIMENTS

Figure 1:
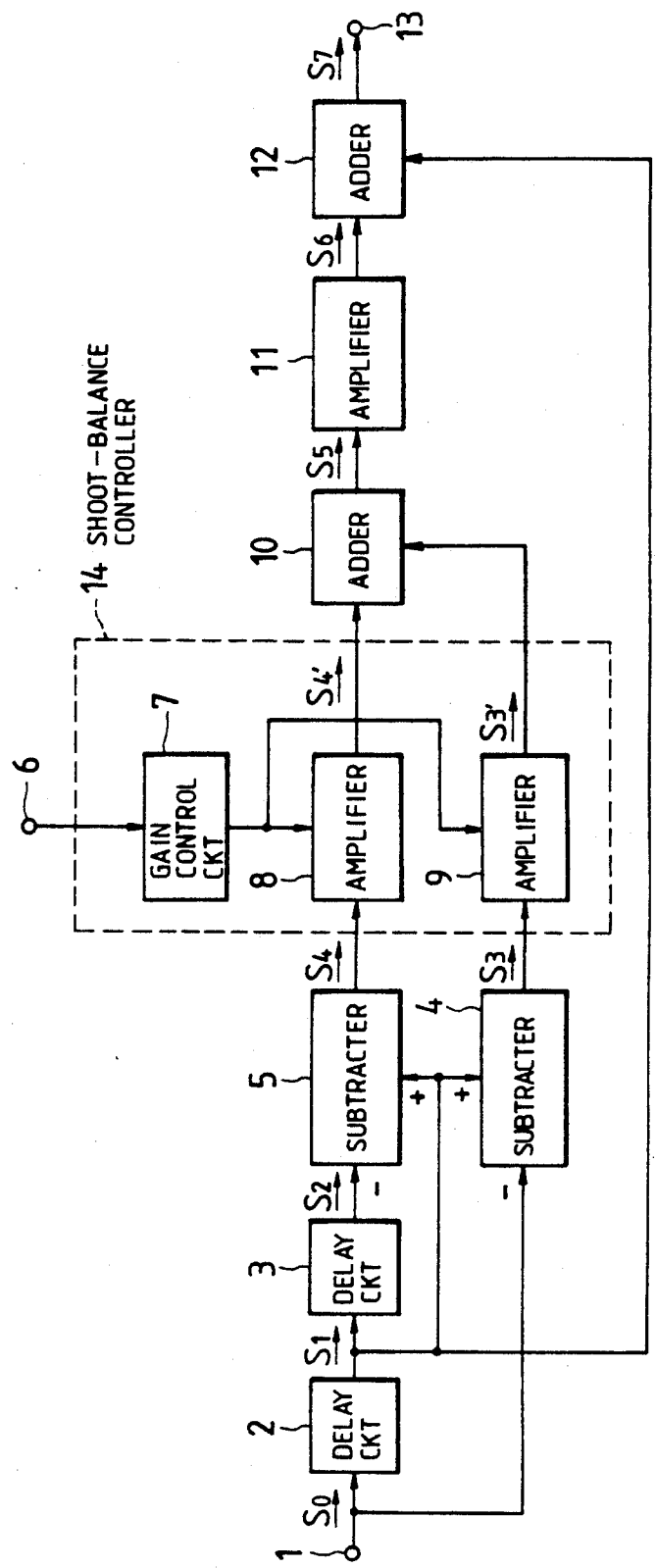
FIG. 1 is a block diagram showing the circuit arrangement of an embodiment of the present invention.
Figure 2:
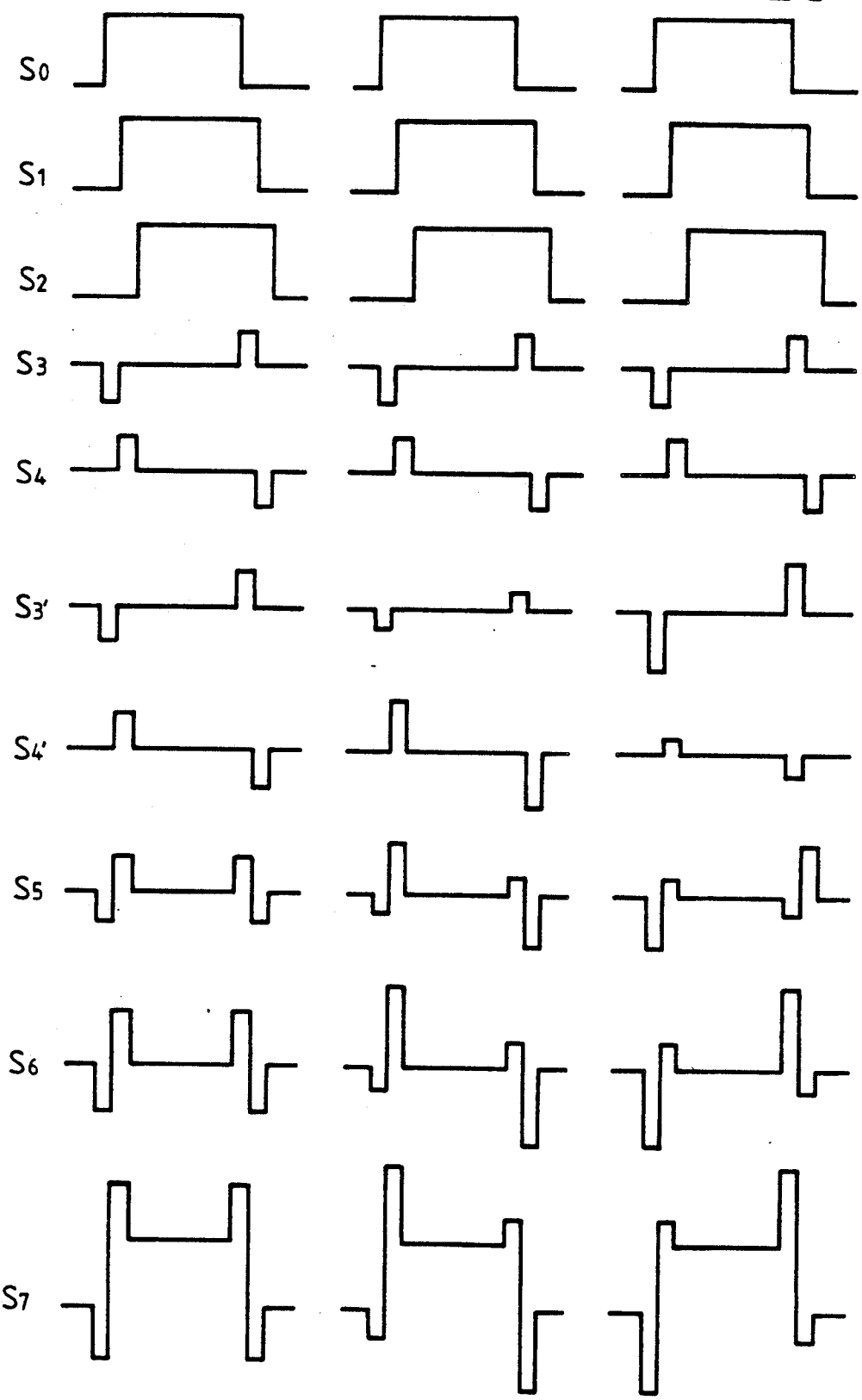
FIGS. 2A-2C are waveform diagrams showing the signal waveforms of various parts in FIG. 1.
Figure 3:
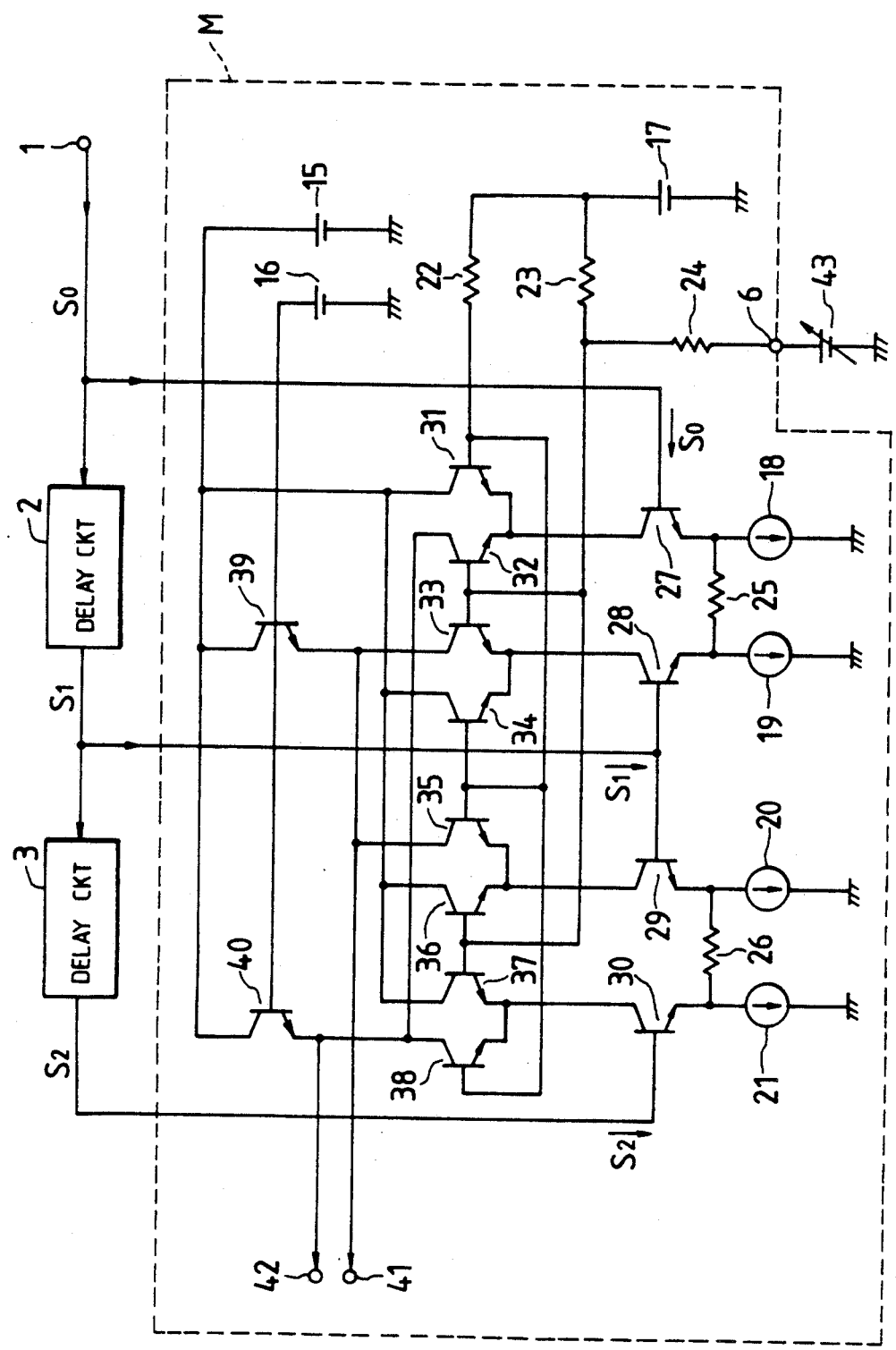
FIG. 3 is a circuit diagram showing a practicable example of an essential portion in FIG. 1.
Figure 6:
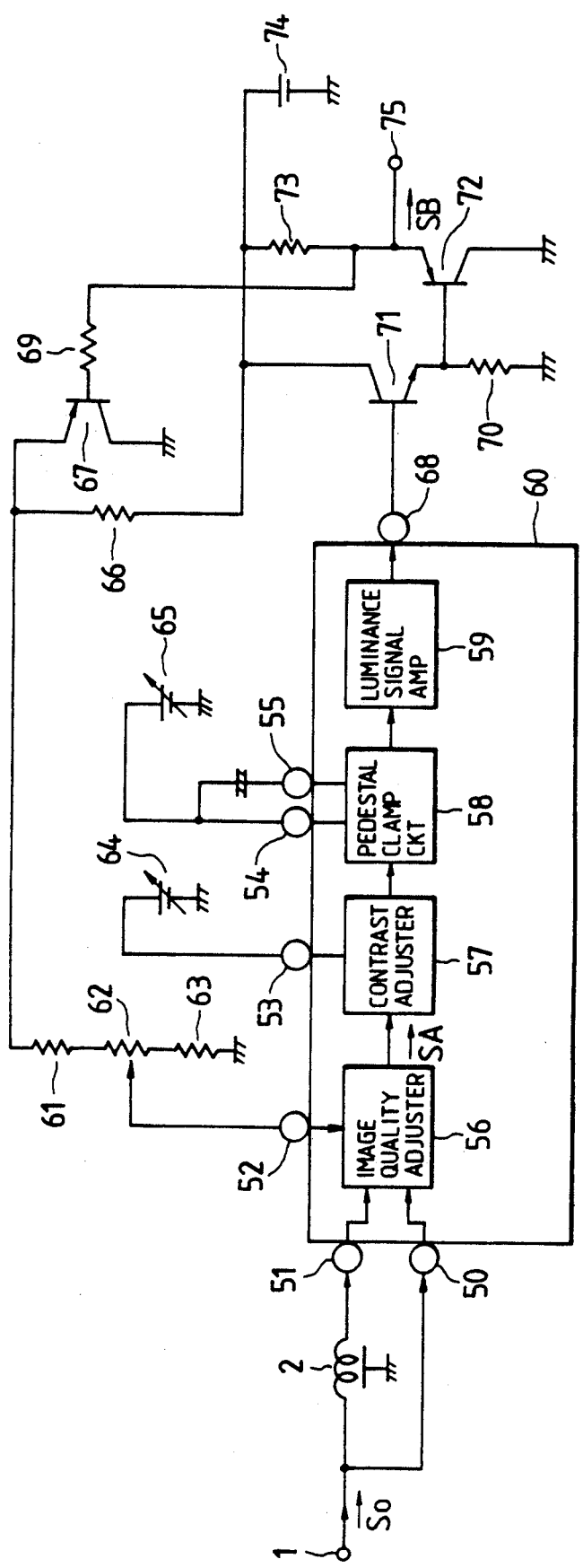
FIG. 6 is a circuit diagram of another prior-art example.

FIG. 1 is a block diagram showing the fundamental arrangement of an embodiment of the present invention, FIGS. 2A-2C are waveform diagrams each showing the signals of various parts in FIG. 1, and FIG. 3 is a circuit diagram showing an example of the practicable circuit of an essential portion in FIG. 1.

In FIG. 1, FIGS. 2A-2C and FIG. 3, constituents equivalent to those of the example of the prior-art circuit illustrated in FIG. 4 and FIGS. 5A-5F are assigned the same symbols.

Referring to FIG. 1, a signal $S_0$ received at a video signal input terminal 1 are passed through a delay circuit 2 and a delay circuit 3 to be respectively delivered as delayed signals $S_1$ and $S_2$. A subtracter 4 subtracts the input signal $S_0$ from the output $S_1$ of the delay circuit 2, thereby to deliver a preshoot signal $S_3$ as an output. A subtracter 5 subtracts the output $S_2$ of the delay circuit 3 from the output $S_1$ of the delay circuit 2, thereby to deliver an overshoot signal $S_4$ as an output.

The preshoot signal $S_3$ and the overshoot signal $S_4$ are respectively applied to variable-gain amplifiers 9 and 8, and they are amplified into gain control characteristics reverse to each other by a gain control circuit 7 which controls the gains of the amplifiers 8 and 9 in accordance with a control input from a shoot-balance control input terminal 6. Accordingly, the ratio between the outputs of the respective amplifiers, namely, the ratio between the amplitudes of a preshoot signal $S_3'$ and an overshoot signal $S_4'$ is set according to the gain control signal. The output signals $S_3'$ and $S_4'$ are added by an adder 10, thereby to become a composite shoot signal $S_5$.

Accordingly, the composite shoot signal $S_5$ becomes one in which the ratio of the amplitudes of the preshoot signal and the overshoot signal has been controlled according to the shoot-balance control input 6.

The composite shoot signal $S_5$ is amplified by an amplifier 11, the output $S_6$ of which and the output signal $S_1$ of the delay circuit 2 are added by an adder 12, whereby a video signal $S_7$ after aperture corrections is delivered to an output terminal 13.

A portion enclosed with a dotted line in the figure, namely, a portion including the gain control circuit 7 and the variable-gain amplifiers 8, 9 is a shoot-balance controller 14, by which the shoot balance of the preshoot and overshoot signals having hitherto been fixed can be rendered variable at will by the use of the single control input. Thus, the versatility of the aperture corrections increases to realize the setting of the shoot balance suited to an input source.

FIGS. 2A-2C are the waveform diagrams each exemplifying the signals $S_0$-$S_7$ of the various parts in FIG. 1. FIG. 2A corresponds to the state in which the amplitude of the preshoot signal and that of the overshoot signal are balanced, FIG. 2B corresponds to the case of making the overshoot signal greater and the preshoot signal smaller by the use of the signal input of the control input terminal 6, and FIG. 2C corresponds to the case of making the preshoot signal greater and the overshoot signal smaller by the use of the signal input of the control input terminal 6.

The signals down to the input signals $S_3$ and $S_4$ of the respective amplifiers 9 and 8 are identical in all the cases of FIGS. 2A-2C, and the balances of the shoot signals differ behind the variable-gain amplifiers 8 and 9. As exemplified in the figures, the amplitude of the composite shoot signal $S_5$ (the preshoot signal + the overshoot signal) can also be held constant, depending upon the way of selecting the gain control characteristics of the variable-gain amplifiers.

FIG. 3 is the circuit diagram showing the practicable example of the essential portion of the circuit depicted in FIG. 1. A circuit portion M enclosed with a broken (dotted) line in FIG. 3 practicable example of the circuit portion which includes the dotted-line portion shown in FIG. 1, namely, the shoot-balance controller 14, and the subtracters 4 and 5.

Referring to FIG. 3, the subtracter 4 for producing the preshoot signal is configured of N-P-N transistors 27, 28, a resistor 25, and current sources 18, 19; the gain thereof is controlled by N-P-N transistors 31 and 32; and the preshoot signal output appears at an output terminal 42 which leads to the line of the emitter of an N-P-N transistor 40.

On the other hand, the subtracter 5 for producing the overshoot signal is configured of N-P-N transistors 30, 29, a resistor 26, and current sources 20, 21; the gain thereof is controlled by N-P-N transistors 37 and 38; and the overshoot signal output appears at the output terminal 42 which leads to the emitter line of the N-P-N transistor 40. Accordingly, the signal composed of the preshoot signal and the overshoot signal is obtained at the output terminal 42. Besides, in this example, the output signals of an output terminal 41 and the output terminal 42 are inverted outputs.

The gain control is performed by the gain control circuit 7 configured of a constant-voltage source 17 and resistors 22, 23 and 24, using a variable-voltage source 43 connected to the shoot-balance control input terminal 6. Besides, in this example, the shunting ratio between the N-P-N transistors 31 and 32 for controlling the gain of the preshoot signal and the shunting ratio between the N-P-N transistors 37 and 38 for controlling the gain of the overshoot signal are controlled in reverse directions, whereby the sum between the amplitudes of the preshoot signal output and the overshoot signal output is held constant even when the shoot balance is changed. An N-P-N transistor 39 and the N-P-N transistor 40 which are the loads of the shoot outputs can also be replaced with resistors.

Thus, according to this example, the shoot balance between the preshoot signal and the overshoot signal can be freely set owing to the control input, and it can also be varied while the sum of the output amplitudes of the preshoot and overshoot signals is held constant. These bring forth the effects that the versatility of the setting of the aperture corrections increases, and that a user can freely set a desired image quality when the control input is controlled by the user.

Figure 8:
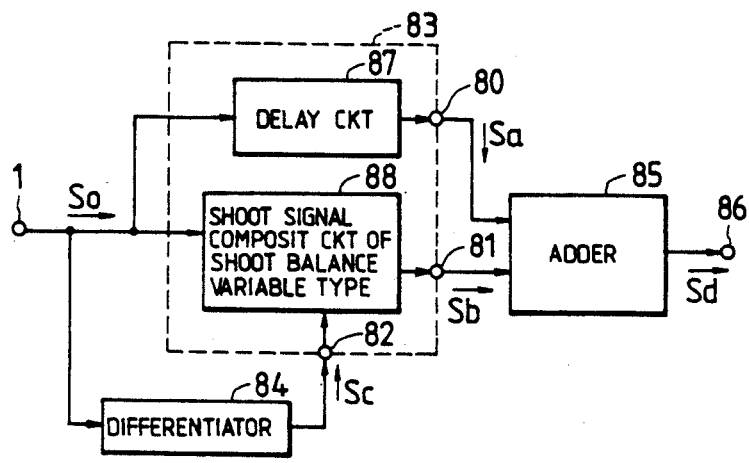
FIG. 8 is a block diagram showing the circuit arrangement of the second embodiment of the present invention.
Figure 9:
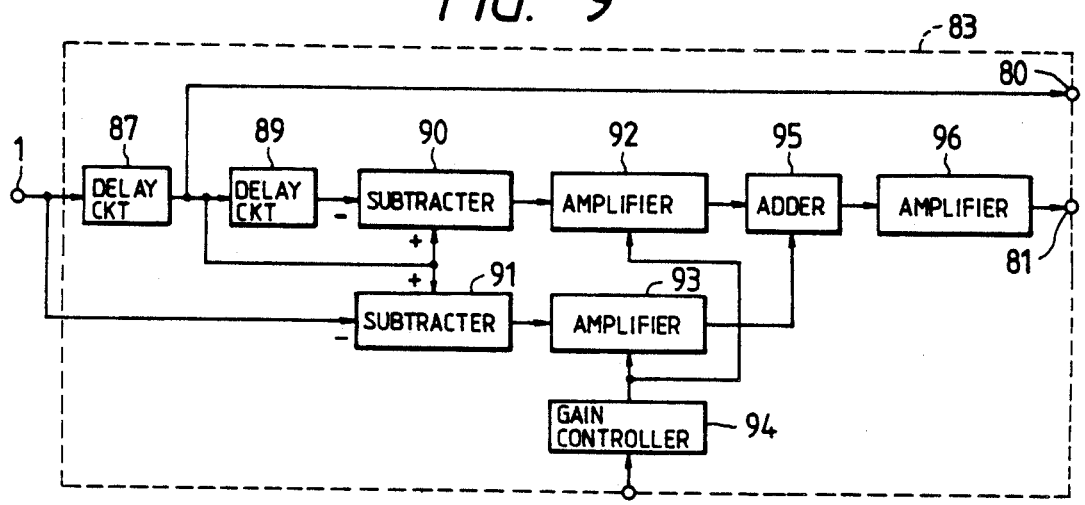
FIG. 9 is a detailed block diagram of a dotted-line part in FIG. 8.

Now, the second embodiment of the present invention will be described. Referring to FIG. 8, a signal $S_0$ received at a video signal input terminal 1 is applied to an aperture correction signal generator 83 which is configured of a delay circuit 87 and a shoot signal composing circuit of variable shoot balance type 88, and to a differentiator 84. The output $S_c$ of the differentiator 84 is applied to the shoot-balance control input terminal 82 of the shoot-balance signal composing circuit 88. Thus, the shoot balance between shoot signals prepared from the input signal $S_0$ is controlled by the variable shoot-balance type shoot signal composing circuit 88, and a composite shoot signal $S_b$ is derived from a composite shoot signal output terminal 81. The signal $S_b$, and a main signal $S_a$, into which the signal $S_0$ is delayed by the delay circuit 87 provided for adjusting a timing and which is delivered from a delayed video output terminal 80, are applied to an adder 85, whereupon the added aperture correction output $S_d$ is obtained at an aperture-corrected video signal output terminal 86. Here, an example of the portion 83 enclosed with a broken line in FIG. 8 can be configured, as shown in FIG. 9, of two delay circuits 87, 89, two subtracters 90, 91, two amplifiers 92, 93 whose gains are controlled in reverse directions by a gain controller 94, an adder 95, and an amplifier 96. These constituents are the same as in the circuit arrangement of FIG. 1.

Figure 10:
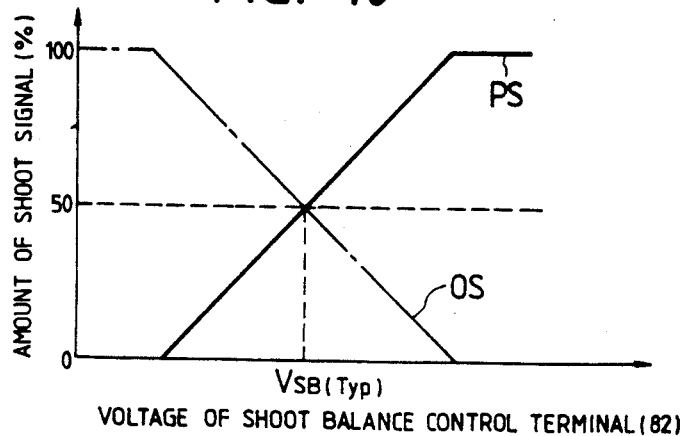
FIG. 10 is a graph showing an example of shoot-balance control characteristics.

The operation of the embodiment in FIG. 8 will be described with reference to FIGS. 11A-11G as to a case where the variable shoot-balance type shoot signal composing circuit 88 has control characteristics shown in FIG. 10 according to which, the ratio of a preshoot signal PS to an overshoot signal OS increases as the control voltage of the shoot-balance control input terminal 82 is raised, whereas the ratio of the overshoot signal OS increases as the control voltage is lowered. Assuming that the input signal $S_0$ has a waveform depicted in FIG. 11A, the output $S_c$ of the differentiator 84 shown in FIG. 8 becomes a waveform depicted in FIG. 11C. Here, let it be assumed that, when the signal $S_c$ is not applied to the shoot-balance control input terminal 82, the composite shoot signal output $S_b$ has a waveform depicted in FIG. 11D, namely, a waveform in which the preshoot signal and the overshoot signal are balanced, and let's consider a case where the output $S_c$ is applied to the control input terminal 82. Then, the signal $S_b$ comes to have a waveform as shown in FIG. 11E, namely, a shoot waveform in which a shoot for a black level is great and a shoot for a white level is small on each of the rise side and fall side of the input signal $S_0$ and the rise and fall of which are substantially symmetric. This composite shoot signal $S_b$, and the main signal $S_a$ obtained in such a way that the input signal $S_0$ is delayed by the delay circuit 87 so as to adjust the shoot timing, are added by the adder 85, whereby the aperture correction output $S_d$ comes to have a waveform depicted in FIG. 11G. That is, the peak of the shoot for the white level is suppressed and the shoot for the black level is enlarged as compared with those of a signal in FIG. 11F in the case where the shoot balance is not controlled by the differentiated signal $S_c$, whereby the signal which suppresses blooming ascribable to the shoot for the white level and in which the shoots for the white level and the shoots for the black level are substantially symmetric to each other can be obtained without spoiling the sharpness of an aperture part. Moreover, since the differentiated signal $S_c$ has its signal level determined in proportion to the amplitude of the input signal $S_0$, the amount of the unbalance the shoot signals becomes small for the small amplitude of the signal $S_0$, and it becomes large for the large amplitude. Thus, when the amplitude of the input signal $S_0$ is small, the balance of the shoot signals becomes close to 50% (the amplitude of the preshoot signal = the amplitude of the overshoot signal), so the ordinary aperture corrections are approximated, and as the amplitude enlarges more, the effect heightens more.

Figure 12:
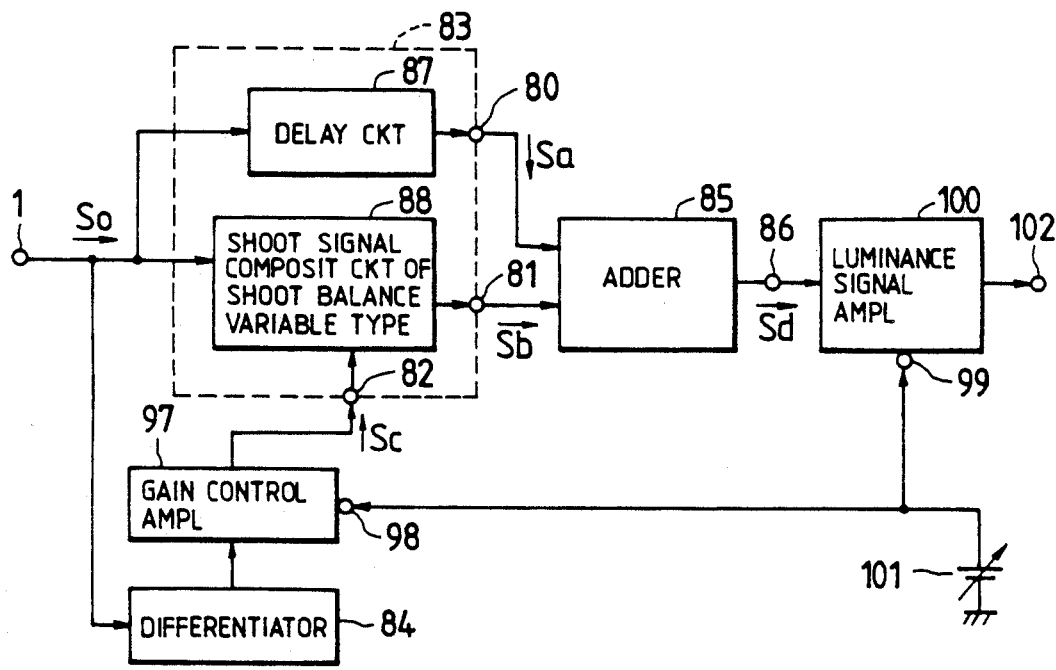
FIG. 12 is a block diagram showing the circuit arrangement of the third embodiment of the present invention.

Next, FIG. 12 is a diagram showing the fundamental arrangement of the third embodiment of the present invention. In the arrangement of FIG. 12, besides the arrangement of FIG. 8, the signal $S_d$ at the aperture-corrected video output terminal 86 is applied to a luminance signal amplifier 100, and the output voltage of a variable-voltage source 101 is applied to a contrast control input terminal 99, whereby the gain of the amplifier 100 is controlled, and a luminance signal is delivered to a luminance signal output terminal 102. Usually, the luminance signal amplifier 100 is built in a video chroma IC in the case of a television receiver, and the signal of the output terminal 102 is applied to a CRT. Further, a gain-controlled amplifier 97 is added between the differentiator 84 and the shoot-balance control input terminal 82 in FIG. 8, and the control input 98 thereof is supplied with the output of the contrast controlling variable-voltage source 101 stated above. In this way, the signal level of the differentiated signal $S_c$ to be applied to the shoot-balance control input 82 can be controlled in proportion to the level of the luminance signal which is applied from the luminance signal output terminal 102 to the CRT, so that the amount of the shoot for the white level on a picture frame can be optimized. Moreover, the aperture correcting adder 85 is usually set as an image quality adjuster and is often capable of varying the amounts of the shoot signals to-be-added in accordance with a control voltage. Therefore, when the controlled-gain amplifier 97 is interlocked also with the image quality controlling voltage, a more optimized picture frame can be reproduced. Here, no problem is posed even when the gain-controlled amplifier 97 is located at a stage prceding the differentiator 84.

Figure 13:
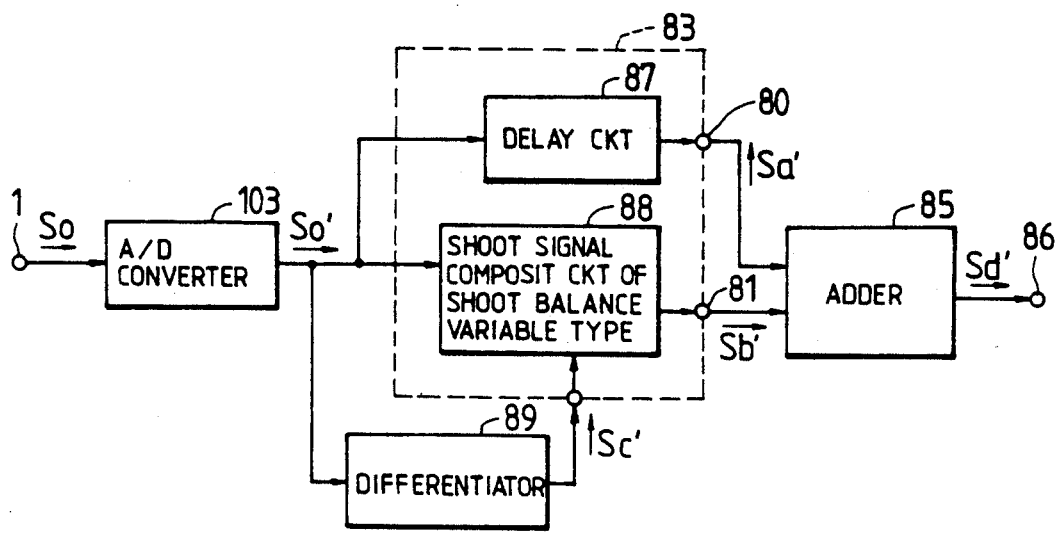
FIG. 13 is a block diagram showing the circuit arrangement of the fourth embodiment of the present invention.

Next, FIG. 13 is a diagram showing the fundamental arrangement of the fourth embodiment of the present invention. In this embodiment, the input signal $S_0$ is converted into a digital signal $S_0'$ by an A/D (analog-to-digital) converter 103, and the same processing as in FIG. 8 is thereafter performed by digital signal processing, whereby effects similar to those of the embodiment in FIG. 8 are achieved.

Next, FIG. 14 is a diagram showing the fundamental arrangement of the fifth embodiment of the present invention. The input signal $S_0$ is converted into the digital signal $S_0'$ by the A/D converter 103 as in FIG. 13, and the same processing as in FIG. 12 is thereafter performed by digital signal processing in the same way as in FIG. 12 that the differentiated signal level for controlling the shoot balance is interlocked with the contrast control. Therefore, a more optimized aperture-corrected picture frame can be reproduced.

The operation of the embodiment in FIG. 13 will be described with reference to FIGS. 15A–15D and FIGS. 11A–11G. Here, the signal waveforms of various parts shall be explained as being converted into analog signals. Although the operation is basically the same as in the case of the analog processing in FIGS. 11A–11G, the differentiated signal $S_c$ in FIG. 11C is converted by the digital processing into a signal $S_c'$ of rectangular-wave pulses each having a pulse width $t_0 = t_1$ (the duration of the preshoot signal) $+ t_2$ (the duration of the overshoot signal) or so, as illustrated in FIG. 15B, and the shoot balance is controlled with this signal, whereby a shoot signal $S_b'$ in FIG. 15C and an aperture-corrected output $S_d'$ in FIG. 15D which are respectively more symmetric than the waveforms in FIG. 11E and FIG. 11G can be produced.

In addition, in any of the embodiments in FIGS. 8, 12, 13 and 14, aperture corrections are made without using the luminance signal at the posterior stage, so that the time delay of the aperture part as in the prior-art system is not involved.

In this manner, according to the present invention, a control signal and an aperture correction signal are obtained from an identical input signal in contrast to the prior-art system in which the aperture corrections of a present-time signal are made by the use of a luminance signal at a final stage, namely, a past signal. Therefore, aperture corrections can be made at the optimal timing, and the amounts of shoot signals for a white level and those of shoot signals for a black level can be rendered symmetric at the rise (black level→white level) part and fall (white level→black level) part of the signal. Moreover, since the amount of the shoot signal for the white level is proportional to the level of the video input signal, the invention is effective to suppress the peak level of the shoot signal for the white level, which brings forth the effect that blooming on a CRT can be relieved.

The present invention is also applicable to digital television, and can be adopted irrespective of analog or digital systems.

Figure 16:
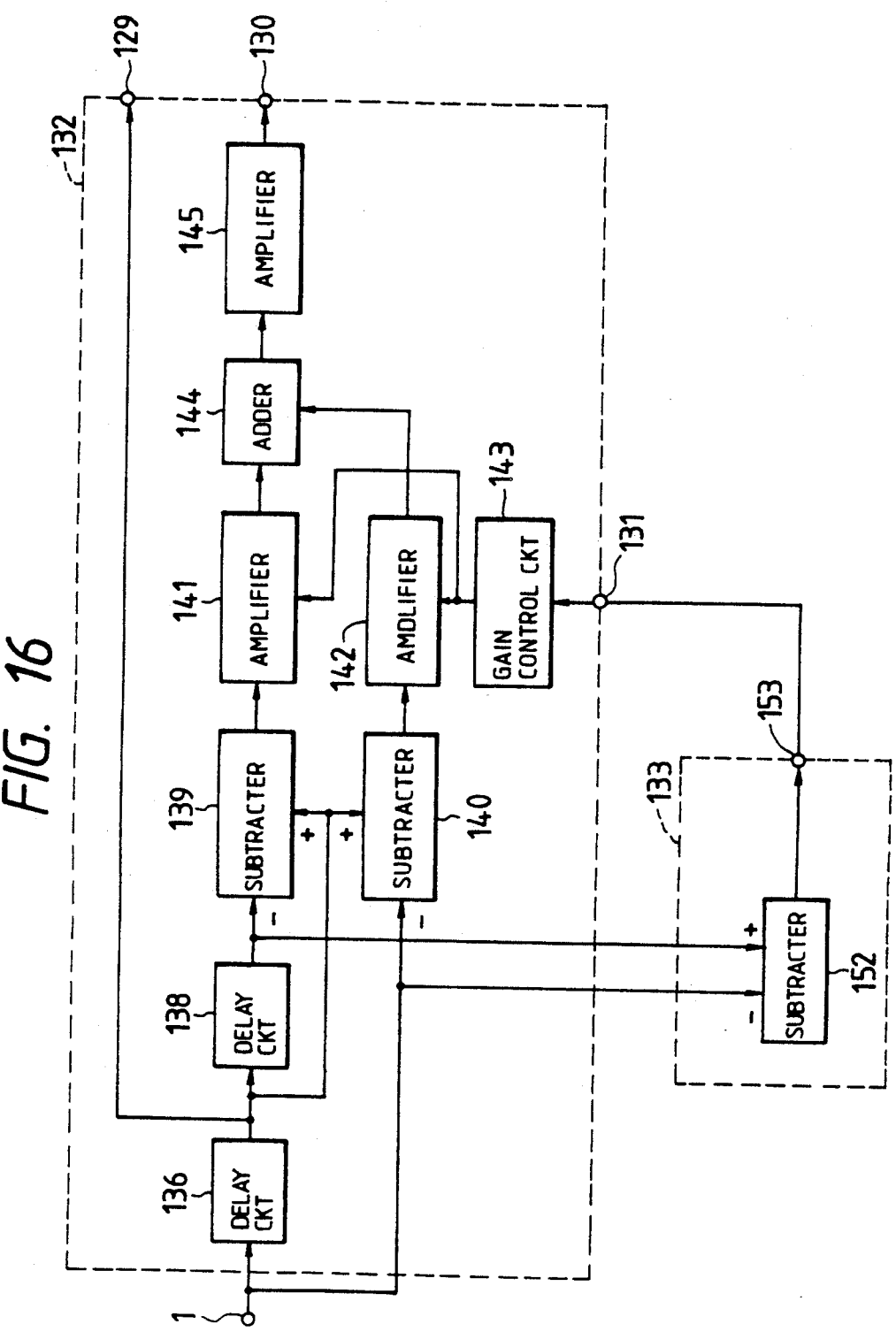
FIG. 16 is a block diagram showing the circuit arrangement of a differentiator for use in the present invention.

Meanwile, as illustrated in FIG. 16, the differentiated signal for controlling the shoot balance can also be produced in such a way that the delay circuits in the shoot signal composing circuit (FIG. 3) are utilized, and that the input of the delay circuit 136 is subtracted from the output of the delay circuit 138. In this case, a portion including a subtracter 152 as enclosed with a broken line constructs a differentiator. The operation of the circuit arrangement in FIG. 16 will be described with reference to FIGS. 17A–17G similar to FIGS. 11A–11G. As shown in FIG. 17C, the differentiated signal $S_3$ produced by the circuit arrangement in FIG. 16 becomes a signal of good symmetry which is controlled by a time width from the start of a preshoot signal to the end of an overshoot signal. Accordingly, when the signal $S_3$ shown in FIG. 17C is applied to a control input terminal 131, a composite shoot signal output $S_2$ becomes a waveform as shown in FIG. 17E, and this waveform is one of good symmetry in which the peak of each shoot signal does not have a slope ascribable to the differentiated signal, in contrast to the case illustrated in FIG. 11E. Therefore, when the signal $S_2$ in FIG. 17E is added with a main signal $S_1$ shown in FIG. 17B, an aperture correction output $S_4$ becomes as shown in FIG. 17G, and the waveform thereof is more improved over the signal $S_d$ in FIG. 11G.

What is claimed is:

1. An aperture correction device for video signals having:
   video signal input means for receiving the video signal,
   aperture correction signal generation means for generating a correcting shoot signal which corrects an aperture of the video signal, and
   addition means connected to the video signal input means and the aperture correction signal generation means, for adding the video signal and the correcting shoot signal and delivering a resulting signal as an output;
   said aperture correction signal generation means comprising:
      preshoot signal generation means connected to said video signal input means, for generating a preshoot signal at an edge part of the video signal,
      overshoot signal generation means connected to said video signal input means, for generating an overshoot signal at the edge part of the video signal, and shoot signal composition means for receiving the preshoot signal and the overshoot signal and for adding the received signals at an addition ratio corresponding to a control signal, supplied to the composition means and for delivering a resulting signal as the correcting shoot signal.

2. An aperture correction device as defined in claim 1, further comprising differential means for generating a differentiated signal of the input video signal and supplying it to said shoot signal composition means as the control signal.

3. An aperture correction device as defined in claim 1, wherein analog-to-digital conversion means is connected at a stage preceding said video signal input means.

4. An aperture correction device as defined in claim 1, further comprising delay means connected between said video signal input means and said addition means, and having a delay amount equal to a circuit delay amount of said aperture correction signal generation means.

5. An aperture correction device for video signals, comprising:
preshoot signal generation means for generating a preshoot signal at an edge part of the video signal,
overshoot signal generation means for generating an overshoot signal at the edge part of the video signal,
first amplification means connected to said preshoot signal generation means, for amplifying the preshoot signal in correspondence with a first gain control signal,
second amplification means connected to said overshoot signal generation means, for amplifying the overshoot signal in correspondence with a second gain control signal,
first addition means connected to said first amplification means and said second amplification means, for adding an output signal of said first amplification means and an output signal of said second amplification means and delivering a correcting shoot signal as an output,
second addition means for adding the original video signal and the correcting shoot signal, and delivering a resulting signal as an output, and
gain control signal generation means for generating the first and second gain control signals and supplying them to said first and second amplification means respectively, so that when a gain of one of said first and second amplification means is increased, a gain of the other amplification means decreases contrariwise.

6. An aperture correction device for video signals having:
video signal input means for receiving the video signal,
aperture correction signal generation means for generating a correcting shoot signal which corrects an aperture of the video signal, and
first addition means connected to the video signal input means and the aperture correction signal generation means, for adding the video signal and the correcting shoot signal and delivering a resulting signal as an output;
said aperture correction signal generation means comprising:

preshoot signal generation means connected to said video signal input means, for generating a preshoot signal at an edge part of the video signal,
overshoot signal generation means connected to said video signal input means, for generating an overshoot signal at an edge part of the video signal,
shoot signal composition means for adding the preshoot signal and overshoot signal at an addition ratio corresponding to a control signal, and for delivering a resulting signal as the correcting shoot signal, and further including:
first amplification means connected to said preshoot signal generation means, for amplifying the preshoot signal in correspondence with a first gain control signal,
second amplification means connected to said overshoot signal generation means, for amplifying the overshoot signal in correspondence with a second gain control signal, and second addition means connected to said first amplification means and said second amplification means, for adding an output signal of said first amplification means and an output signal of said second amplification means and delivering a resulting signal as the correcting shoot signal.

7. An aperture correction device for video signals having:
video signal input means for receiving the video signal,
aperture correction signal generation means for generating a correcting shoot signal which corrects an aperture of the video signal, and
first addition means connected to the video signal input means and the aperture correction signal generation means, for adding the video signal and the correcting shoot signal and delivering a resulting signal as an output;
said aperture correction signal generation means comprising:
preshoot signal generation means connected to said video signal input means, for generating a preshoot signal at an edge part of the video signal,
overshoot signal generation means connected to said video signal input means, for generating an overshoot signal at an edge part of the video signal,
shoot signal composition means for adding the preshoot signal and the overshoot signal at an addition ratio corresponding to a control signal, and for delivering a resulting signal as the correcting shoot signal, and further including:
first amplification means connected to said preshoot signal generation means, for amplifying the preshoot signal in correspondence with a first gain control signal,
second amplification means connected to said overshoot signal generation means, for amplifying the overshoot signal in correspondence with a second gain control signal, and
second addition means connected to said first amplification means and said second amplification means, for adding an output signal of said first amplification means and an output signal of said second amplification means and delivering a resulting signal as the correcting shoot signal;
and control signal generation means for generating first and second gain control signals and supplying them to said first and second amplification means respectively, so that when the gain of one of said first and second amplification means is increased, the gain of the other amplification means decreases contrariwise.

8. An aperture correction device for video signals having:
   video signal input means for receiving the video signal,
   aperture correction signal generation means for generating a correcting shoot signal which corrects an aperture of the video signal, and
   first addition means connected to the video signal input means and the aperture correction signal generation means, for adding the video signal and the correcting shoot signal and delivering a resulting signal as an output;
   said aperture correction signal generation means comprising:
   preshoot signal generation means connected to said video signal input means, for generating a preshoot signal at an edge part of the video signal,
   overshoot signal generation means connected to said video signal input means, for generating an overshoot signal at an edge part of the video signal,
   shoot signal composition means for adding the preshoot signal and the overshoot signal at an addition ratio corresponding to a control signal, and for delivering a resulting signal as the correcting shoot signal, and
   luminance signal amplification means connected to an output end of said addition means, and said control signal changed in interlocking with a contrast control signal of said luminance signal amplification means.

* * * * *